No. 774,083. PATENTED NOV. 1, 1904.
R. KNIETSCH.
APPARATUS FOR MAKING SULFURIC ANHYDRID.
APPLICATION FILED AUG. 6, 1898.
NO MODEL.
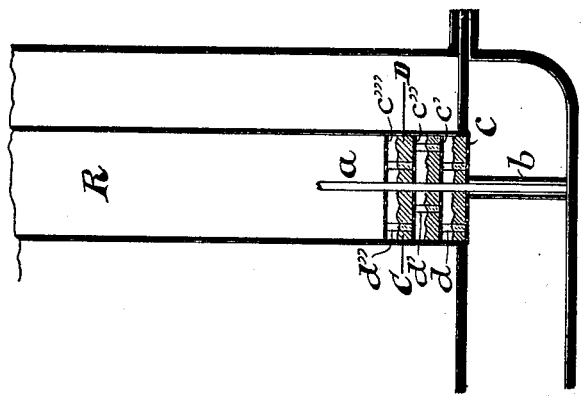
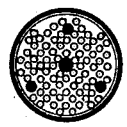
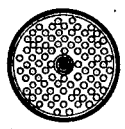
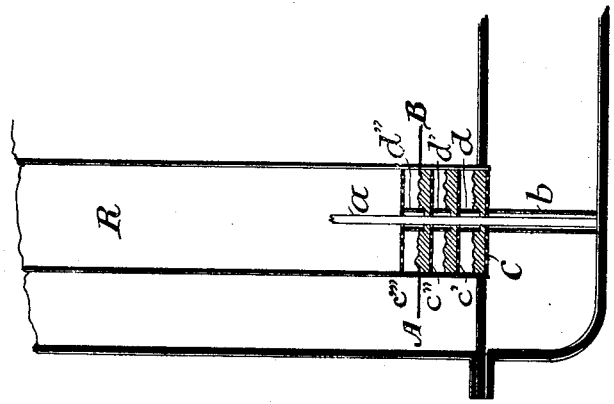
Witnesses.
Albert E. Laycock
Fred S. Kemper
Inventor.
Rudolph Knietsch
by Gifford & Bull
Attys.

No. 774,083.

Patented November 1, 1904.

UNITED STATES PATENT OFFICE.

RUDOLPH KNIETSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

APPARATUS FOR MAKING SULFURIC ANHYDRID.

SPECIFICATION forming part of Letters Patent No. 774,083, dated November 1, 1904.

Application filed August 6, 1898. Serial No. 687,912. (No model.)

*To all whom it may concern:*

Be it known that I, RUDOLPH KNIETSCH, doctor of philosophy, a subject of the King of Prussia, Emperor of Germany, residing at Ludwigshafen-on-the-Rhine, in the Kingdom of Bavaria and Empire of Germany, have invented new and useful Improvements in the Manufacture of Sulfuric Anhydrid and Apparatus for Use Therein, of which the following is a specification.

In Letters Patent No. 652,119, granted June 19, 1900, on an application filed July 14, 1898, Serial No. 685,969, and in another application filed August 5, 1898, Serial No. 687,770, I have described improvements in the manufacture of sulfuric anhydrid.

My present invention consists in a further improvement susceptible of use in connection with the improvements described in said patent and application; but I am not to be understood as limiting myself to the use of my present improvement in connection with the improvements of said patent or application.

It consists of an apparatus for the manufacture of sulfuric anhydrid involving a suitable arrangement of the contact mass and the conducting of the manufacture at or near the ordinary atmospheric or even less than atmospheric pressure, whereby there is secured a considerable reduction of the costs hitherto caused by pumping or forcing the mixed gases through the contact-tube. Moreover, by the aid of my invention the conditions existing in the contact-chamber contribute toward the prevention or the easy removal by cooling of that high degree of heat which I have discovered to be so prejudicial to an efficient yield of sulfuric anhydrid by catalytic action, these conditions being the dispersed condition of the contact material, the diffused condition of the passing gases, and the substantial non-existence of pressure, combined with the compulsion of all parts of the gas to pass equably through the mass of contact material, or, in other words, while still compelling all of the gases to pass equably through the contact material, as in my Patent No. 652,119, so as to insure the equable combination thereof, I now spread the contact material and the catalytic heat through a greater length of contact-compartment and separate it into sections, thereby facilitating the maintaining of the temperature within the limits, preventing decomposition. In said Patent No. 652,119 I have shown various forms of apparatus containing a contact-chamber, a passage adjacent to said chamber for a cooling fluid, whereby the excess of heat due to the reaction is removed, and means for controlling the cooling capacity thereof.

In the accompanying drawings herein, Figure 1 represents the contact-chamber R of said Patent No. 652,119 in vertical section with my present improvement applied. Fig. 2 is the same thing, excepting that it contains another form of my present improvement. Fig. 3 is a horizontal section on the line A B of Fig. 1 with the contact material removed. Fig. 4 is a horizontal section on the line C D of Fig. 2 with the contact material removed.

In the chamber process for the manufacture of sulfuric acid the gases under treatment are largely or entirely kept in motion in the desired direction by means of the draft of a high chimney—that is, by means which cost nearly nothing. If it be desired to prepare the acid of the strength of ordinary unconcentrated chamber-acid by means of the contact process, a similar regard for economy in details must be observed and everything avoided causing additional expense. If in the contact process platinized asbestos or a similar loose-contact mass is used and is merely packed into plain tubes, then on forcing the mixed gases through the contact material so packed the said material is pressed together to a compact mass, and it requires considerable pumping pressure to force the gases through the mass.

Hitherto it has been supposed that under pressure the gases combine more efficiently, as described in patents granted for operating under pressure.

In the process employed in the apparatus herein shown I conduct the manufacture substantially without pressure—that is to say, at approximately atmospheric pressure or below—by removing or permitting the escape of the sulfuric anhydrid from the contact material at approximately atmospheric pressure or below and dividing the contact material into layers, each having a support independent of the other layers, so that the several layers are relieved of the weight of each other, and the contact material is prevented from massing, but, on the contrary, is held under such a condition that while the gases are compelled to pass through the resistance to their passage is minimized. I have found that working under these conditions the saving of the cost of producing pressure more than counterbalances the advantage, if any, secured by working under pressure in the old processes.

In my present apparatus the tubes containing the said contact material are divided up into a number of compartments by the insertion in any suitable way of a number of perforated plates or sieves, and upon each plate a layer of contact material is placed sufficient to cover up the plate from wall to wall, including perforations and the opening between the periphery of the plate and the wall of the tube. The principle is that the several layers shall be relieved in whole or in part of pressure from each other, while the gas shall have no other course than through the contact mass.

Referring now to the accompanying drawings, $a$ is an iron rod suitably supported at the bottom of a contact-tube R and passing up its central line. Over this rod a narrow tube $b$ may be placed, reaching up the rod to the elevation of the lower end of the contact mass in the contact-tube. The first perforated plate $c$ is then passed down the contact-tube, over the rod $a$, and rests upon the narrow tube $b$. Upon this plate a sufficient platinized asbestos or similar contact mass is placed to cover up the perforations and periphery, as aforesaid. Next a bead or short piece of narrow tube $d$ is passed down the contact-tube over the rod $a$ until it is supported by the perforated plate $c$ or a portion of the contact material resting thereon. Next another perforated plate $c'$ is placed in position to rest on the head $d$ and is covered by a layer of contact material. This process is continued until the contact-tube is sufficiently charged. The length of the beads regulates the distance apart of the contact-mass layers and this can be varied at will. The rod $a$ thus forms substantially a connecting member for the series of plates, which series and their separators and said connecting member form a structure standing loosely within the bore of the tube R. In this construction each layer of asbestos rests upon its plate, and this pressure is transferred to the beads and the narrow tube $b$, so that the asbestos as a whole is substantially relieved from pressure and a more satisfactory result achieved.

Of course other means can be adopted provided that the principles above stated be observed. Thus the perforated plates can be supported by tripods $D^3 D^4 D^5$ instead of by the narrow tubes or beads strung upon the central rod.

A process described herein and which may be conducted in the apparatus which is the subject of this application is the subject of an application which is a division hereof, filed February 13, 1901, and therefore no claim is made herein for said process.

Having thus described my invention, what I claim is—

1. In combination, a contact-compartment inclosure, a plurality of substantially horizontal layers of contact material adapted for the formation of sulfuric anhydrid by catalytic action arranged in a substantially vertical series and each extending substantially across said contact-compartment, gas-passages connected with said compartment respectively above and below said plurality of layers, a series of pervious supports detached from the walls of said compartment and a connecting member extending through said series of supports.

2. In combination, a contact-compartment inclosure open at the top and bottom, a series of layers of contact material adapted for the formation of sulfuric anhydrid by catalytic action, a series of pervious supports for said layers detached from said inclosure, a support at the bottom of said inclosure whereby the weight of said series of plates and the layers thereon is sustained and a member whereby the various plates of said series are connected.

3. In combination, a contact-compartment inclosure, a series of layers of contact material adapted for the formation of sulfuric anhydrid by catalytic action, a series of pervious supports for said layers, a series of intermediate supports whereby each of said plates is loosely supported on its neighbor and a member by which the various supports of said series are connected together.

4. In combination, a series of layers of contact material adapted for the formation of sulfuric anhydrid by catalytic action, a series of perforated plates for said layers, a vertical tubular inclosure provided with an opening at the top corresponding with its bore and therefore permitting the longitudinal insertion of said perforated plates from the top and a longitudinal member whereby the various plates of said series are connected.

5. In combination, the contact-compartment inclosure, a rod extending into said compartment, a series of pervious supports carried by said rod and dividing said compartment into a series of chambers and in each chamber a layer of contact material adapted for the formation of sulfuric anhydrid by catalytic action.

In witness whereof I have hereunto set my hand in the presence of two subscribing witnesses.

RUDOLPH KNIETSCH.

Witnesses:
GUSTAV L. LICHTENBERGER,
ADOLPH RENTLINGER.